(12) United States Patent
Kang et al.

(10) Patent No.: US 8,545,048 B2
(45) Date of Patent: Oct. 1, 2013

(54) LED ILLUMINATION STRUCTURE WITHOUT LIGHT GUIDE PLATE

(75) Inventors: Chih-Chieh Kang, Tainan (TW); Jeng-Feng Lin, Tainan (TW); Hong-Ze Li, Tainan (TW); Shih-Fu Tseng, Tainan (TW)

(73) Assignee: Southern Taiwan University, Tainan (TW)

( * ) Notice: Subject to any disclaimer, the term of this patent is extended or adjusted under 35 U.S.C. 154(b) by 51 days.

(21) Appl. No.: 13/221,288

(22) Filed: Aug. 30, 2011

(65) Prior Publication Data

US 2012/0287626 A1 Nov. 15, 2012

(30) Foreign Application Priority Data

May 13, 2011 (TW) .............................. 100116931 A

(51) Int. Cl.
*F21V 7/00* (2006.01)
(52) U.S. Cl.
USPC ............................ 362/243; 362/247; 362/346
(58) Field of Classification Search
USPC ................ 362/241, 242, 243, 244, 247, 297, 362/341, 346, 623, 624, 625
See application file for complete search history.

(56) References Cited

U.S. PATENT DOCUMENTS

| | | | | |
|---|---|---|---|---|
| 4,874,228 A * | 10/1989 | Aho et al. | ..................... | 362/625 |
| 4,929,866 A * | 5/1990 | Murata et al. | ................. | 362/297 |
| 4,989,122 A * | 1/1991 | Allekotte et al. | ............. | 362/346 |
| 7,530,712 B2 * | 5/2009 | Lin et al. | ....................... | 362/247 |
| 7,750,982 B2 * | 7/2010 | Nelson et al. | ................. | 362/602 |
| 2003/0095407 A1 * | 5/2003 | Yao | ............................... | 362/241 |
| 2006/0133113 A1 * | 6/2006 | Koike et al. | .................. | 362/626 |

\* cited by examiner

*Primary Examiner* — Y My Quach Lee
(74) *Attorney, Agent, or Firm* — Muncy, Geissler, Olds & Lowe, PLLC

(57) ABSTRACT

An LED illumination structure without a light guide plate (LGP) includes an optical bottom plate, a plurality of LED illumination components arranged at least along one side edge of the optical bottom plate and a plurality of reflecting structures parallel to the LED illumination components formed on the optical bottom plate from two opposite side edges of the optical bottom plate to a center of the optical bottom plate. The reflecting structures are in a shape of tapered embossment and include a first side facing the center of the optical bottom plate and a second side facing the side edges of the optical bottom plate. An optical film is arranged in a raising direction of the reflecting structures of the optical bottom plate. The present invention is applicable to an illumination lamp for generating a uniform light emitting or may further be an illumination structure for projecting a light source of a bare-eyed 3D image.

12 Claims, 13 Drawing Sheets

LED ILLUMINATION STRUCTURE WITHOUT LIGHT GUIDE PLATE

BACKGROUND

1. Field of Invention

The present invention relates to an LED illumination structure without a light guide plate (LGP), and more particularly to a side light LED illumination structure without the LGP capable of generating a uniform light emitting.

2. Description of Related Art

LEDs have the advantages of high illumination, power saving and long lifespan and will be the next start product in the lighting industry. Currently, the lighting LED illumination structure mainly includes a straight-down LED illumination structure, for example, the U.S. Pat. No. 7,819,542 entitled "Planar illumination light source device and planar illumination light device," which mainly adopts a reflecting structure of a top diffusion sheet to realize the uniform light emitting.

Moreover, a side light LED illumination structure has been disclosed, for example, the ROC Patent No. 1341419 "backlight module," which mainly adopts a light guide plate to guide light rays to an optical film like the diffusion sheet and then emit the light. Compared with the straight-down LED illumination structure, the side light LED illumination structure has the advantage of thin thickness and is adapted to serve as a large-scale illumination structure. However, this LED illumination structure is mainly used in the backlight module of an LCD display and has the defect of a heavy weight when used in the lighting facility.

The U.S. Pat. No. 5,453,855 entitled "Liquid crystal display device backlit by LED's coupled to printed circuit board," the U.S. Pat. No. 6,966,684 entitled "Optical wave guide" or the ROC Patent No. 1318710 entitled "backlight module without LGP and diffusion plate" are directed to overcome the defects of the side light LED illumination structure. In the aforementioned patents, the light guide plate is omitted and a particular reflecting structure of a reflecting bottom plate is employed for reflecting the light rays to form a uniform light emitting surface.

However, either the straight-down LED illumination structure or the side light LED illumination structure in any forms is still in need of improvement of the light emitting uniformity of the light emitting surface.

Additionally, with the progress of the 3D image technology, the bare-eyed 3D image is the key technology under development by the researchers. However, the bare-eyed 3D image technology is disadvantageous in the control of the light projection of the illumination structure. An illumination structure adapted for the bare-eyed 3D image technology has been disclosed in the U.S. Pat. No. 7,750,982 entitled "Autostereoscopic display with fresnel lens element and double sided prism film adjacent a backlight having a light transmission surface with left and right eye light sources at opposing ends modulated at a rate of at least 90 Hz." However, the illumination structure still needs the light guide plate for guiding the emitting of the light rays, so this illumination structure also has the defects of a heavy weight and a large thickness.

SUMMARY

The present invention is directed to providing an LED illumination structure without a light guide plate (LGP) that is different to the aforementioned prior arts. The illumination structure is a side light LED illumination structure that can achieve a uniform light emitting effect and may serve as lighting equipment.

Moreover, with the progress of the bare-eyed 3D technology, the present invention may further provide an illumination structure for projecting a light source of the bare-eyed 3D image.

Accordingly, the present invention is an LED illumination structure without the LGP, which includes an optical bottom plate, a plurality of LED illumination components at least arranged along one side edge of the optical bottom plate and a plurality of reflecting structures parallel to the LED illumination components formed on the optical bottom plate from two opposite side edges of the optical bottom plate to a center of the optical bottom plate. The reflecting structures are in a shape of tapered embossment and include a first side facing the center of the optical bottom plate and a second side facing the side edges of the optical bottom plate. An optical film is arranged in a raising direction of the reflecting structures of the optical bottom plate.

Furthermore, the first side of each reflecting structure is a vertical surface and the second side of the reflecting structure is a slope.

Furthermore, the center of the optical bottom plate forms a horizontal recess.

Furthermore, the second sides of the reflecting structures of the optical bottom plate are intersected at the center of the optical bottom plate.

Furthermore, the reflecting structures are gradually raised towards the center of the optical bottom plate.

Furthermore, an optical axis direction of the LED illumination components points to the second sides of the reflecting structures.

Furthermore, a half-power angle of radiation of the LED illumination components ranges from 5° to 15°.

Furthermore, the optical film is a diffusion sheet and preferably a reverse prism layer with a zigzag cross-section is arranged on a side of the diffusion sheet facing the optical bottom plate.

Furthermore, the optical bottom plate is in a shape of polygon and the LED illumination components are arranged on the two opposite side edges of the optical bottom plate.

Furthermore, the optical film is a prism and a reverse prism structure with a zigzag cross-section is arranged on the side of the prism facing the optical bottom plate. The prism has a plurality of arc embossment structures adjacent to one another corresponding to the aforementioned reverse prism structures.

Furthermore, the optical bottom plate is in a shape of polygon and the LED illumination components are disposed on a periphery of the optical bottom plate.

Furthermore, the optical bottom plate is in a round shape and the LED illumination components are disposed on a periphery of the optical bottom plate.

Furthermore, the LED illumination components are arranged in a reflection mask.

The present invention has the following effects.

1. The present invention is a side light LED illumination structure, which can reduce the thickness of the illumination structure and is suitable for all kinds of lighting conditions. As compared with a straight-down LED illumination structure, the emitted light rays of the present invention are uniform and soft.

2. The side light LED illumination structure may be extensively applied in the large-sized lamp and thus has the potential of development.

3. By the use of the LED illumination components arranged on two opposite side edges of the optical bottom plate of the illumination structure of the present invention for emitting lights sequentially and the prism of the present invention, the illumination structure may serve as a light projection structure of the bare-eyed 3D image technology.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The main effects of the LED illumination structure without the light guide plate (LGP) of the present invention will be clearly illustrated in the following embodiments.

Figure 1:
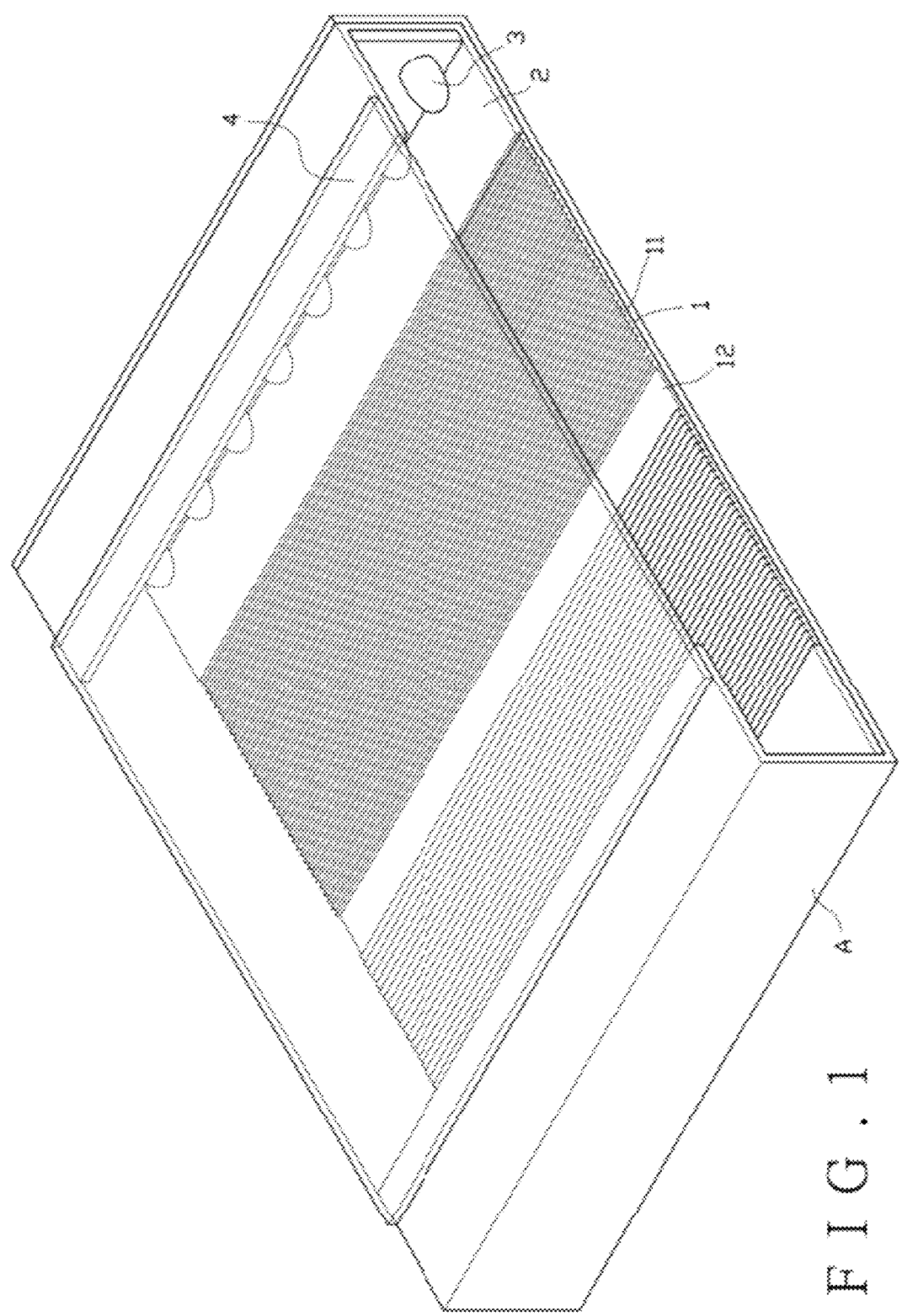
FIG. 1 is a perspective view illustrating the appearance of a first embodiment of the present invention.
Figure 2:
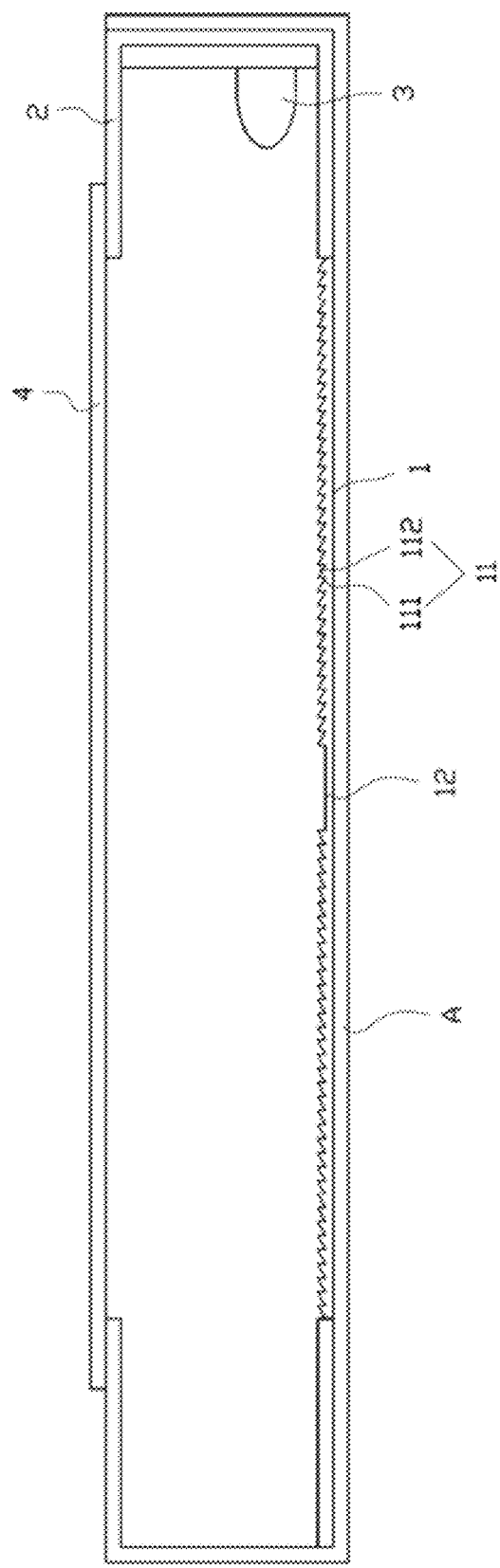
FIG. 2 is a side view illustrating the first embodiment of the present invention.

FIG. 1 and FIG. 2 show the first embodiment of the present invention. The illumination structure of this embodiment is assembled on a frame (A) and includes a rectangular optical bottom plate (1), a reflection mask (2) connected to one side edge of the optical bottom plate (1) and a plurality of LED illumination components (3) disposed in the reflection mask (2) along the side edge of the optical bottom plate (1). A half-power angle of radiation of the LED illumination components (3) ranges from 5° to 15°. Additionally, a plurality of reflecting structures (11) parallel to the LED illumination components (3) is formed on the optical bottom plate (1) from two opposite side edges of the optical bottom plate (1) to the center of the optical bottom plate (1). The reflecting structures (11) are in a shape of tapered embossment and include a first side (111) facing the center of the optical bottom plate (1) and a second side (112) facing the side edges of the optical bottom plate (1). The first side (111) is a vertical surface and the second side (112) is a slope. The center of the optical bottom plate (1) forms a horizontal recess (12) adjacent to the reflecting structures (11). A diffusion sheet (4) is arranged in a raising direction of the reflecting structure (11) of the optical bottom plate (1).

Referring to FIG. 2, the high-directivity LED illumination component (3) are used to project most parts of the light rays to the reflecting structures (11). By the use of the particular profile of the reflecting structures (11), a uniform diffused reflection of the light rays is generated towards the diffusion sheet (4), to and after incident on the diffusion sheet (4), the light rays are diffused by the diffusion sheet (4) to form a uniform light emitting surface.

Figure 3:
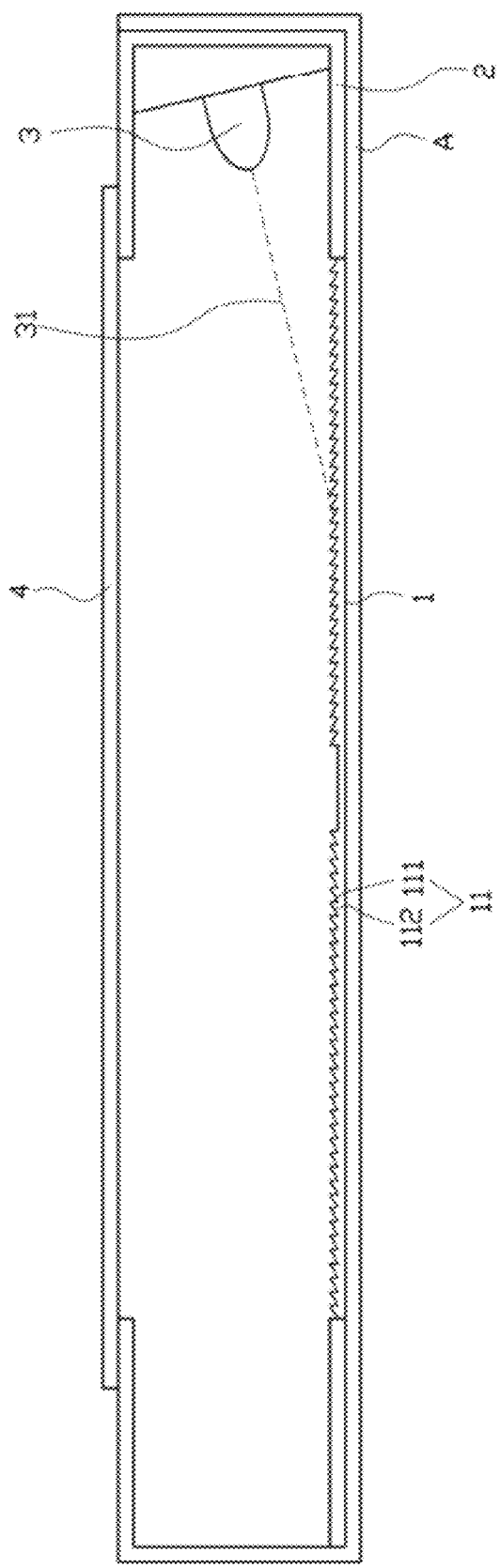
FIG. 3 is a schematic view illustrating a structure of a second embodiment of the present invention.

FIG. 3 shows a second embodiment of the present invention. In the second embodiment, an optical axis direction (31) of the LED illumination components (3) faces the second sides (112) of the reflecting structures (11), for projecting more light rays generated by the LED illumination components (3) to the reflecting structures (11), so as to generate a more uniform light emitting surface.

Figure 4:
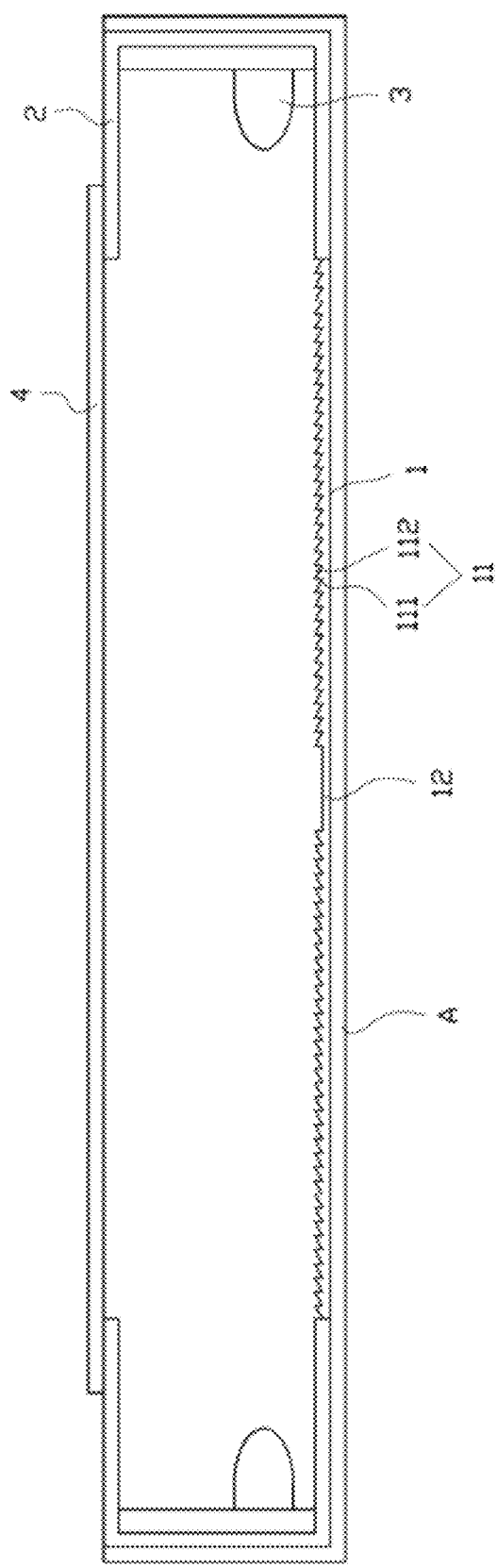
FIG. 4 is a schematic view illustrating a structure of a third embodiment of the present invention.

FIG. 4 shows a third embodiment of the present invention. Different from the first embodiment, two opposite side edges of the optical bottom plate (1) are both connected with a reflection mask (2), and a plurality of LED illumination components (3) are arranged in the reflection masks (2) along the side edge of the optical bottom plate (1), so that the light emitting surface diffused by the diffusion sheet (4) has a better uniformity and brightness.

Figure 5:
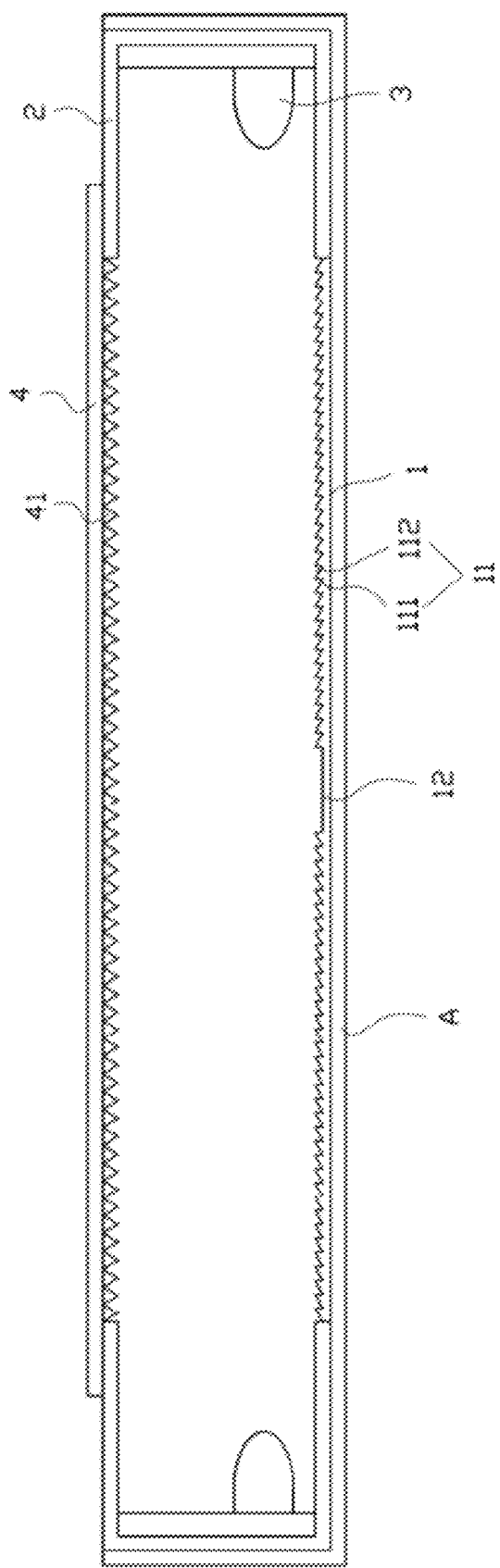
FIG. 5 is a schematic view illustrating a diffusion sheet with a reverse prism layer according to the third embodiment of the present invention.

Moreover, referring to FIG. 5, a reverse prism layer (41) with a zigzag cross-section is further arranged on the side of the diffusion sheet (4) facing the optical bottom plate (1). Hence, when the light rays are projected to the diffusion sheet (4), uniform refraction and diffusion are formed, so that the light rays are further diffused by the diffusion sheet (4) to form a uniform illumination surface.

Figure 6:
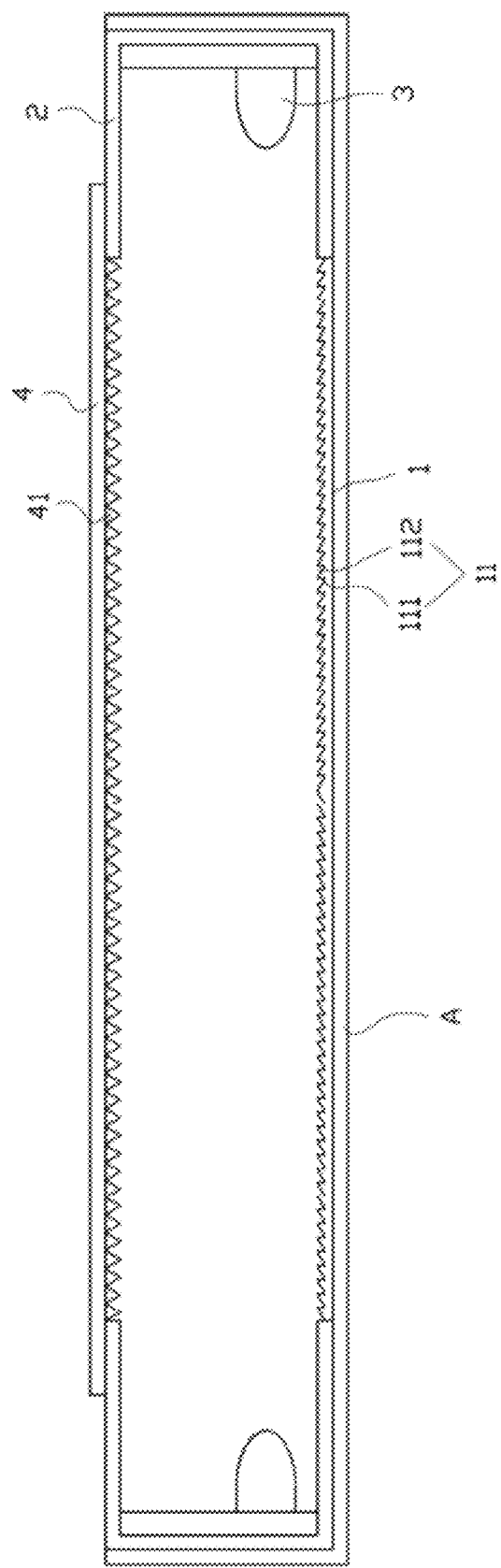
FIG. 6 is a schematic view illustrating a variation of the third embodiment of the present invention, in which the second sides of the reflecting structures are intersected at the center of the optical bottom plate.
Figure 7:
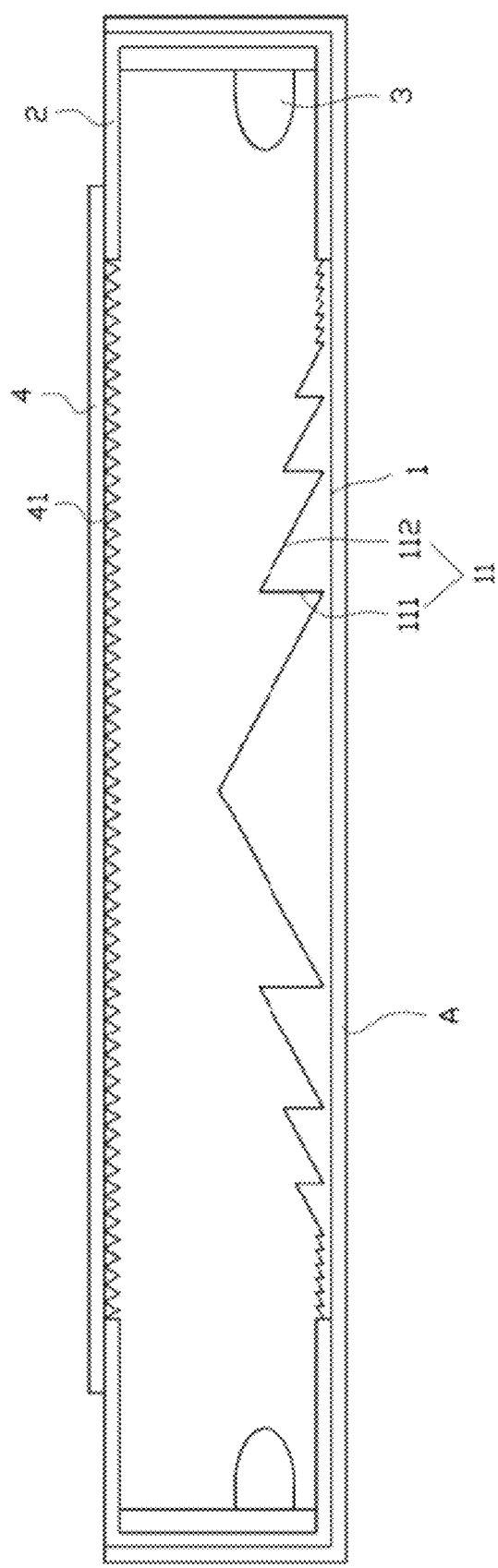
FIG. 7 is a schematic view illustrating a variation of the third embodiment of the present invention, in which the reflecting structures are gradually raised towards the center of the optical bottom plate.

Then, referring to FIG. 6 and FIG. 7, in any embodiment of the present invention, the second sides (112) of the reflecting structures (11) of the optical bottom plate (1) are intersected at the center of the optical bottom plate (1), or the reflecting structures (11) of the optical bottom plate (1) are gradually raised towards the center of the optical bottom plate (1). Also, the diffusion sheet (4) is used to diffuse a uniform illumination surface.

Figure 8:
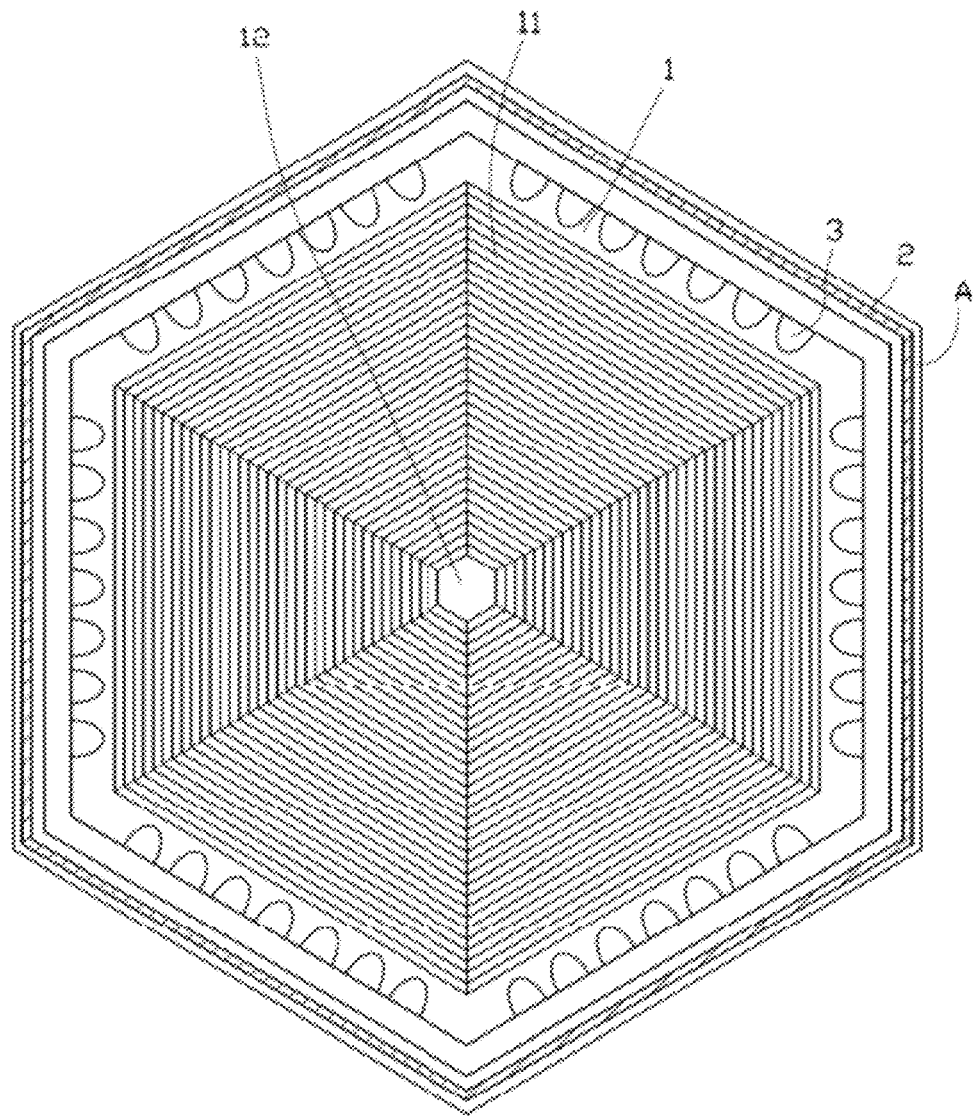
FIG. 8 is a schematic view illustrating a structure of a fourth embodiment of the present invention.

FIG. 8 shows a fourth embodiment of the present invention. In the fourth embodiment, the optical bottom plate (1) is in a shape of hexagon, and the LED illumination components (3) are disposed on a periphery of the optical bottom plate (1).

Figure 9:
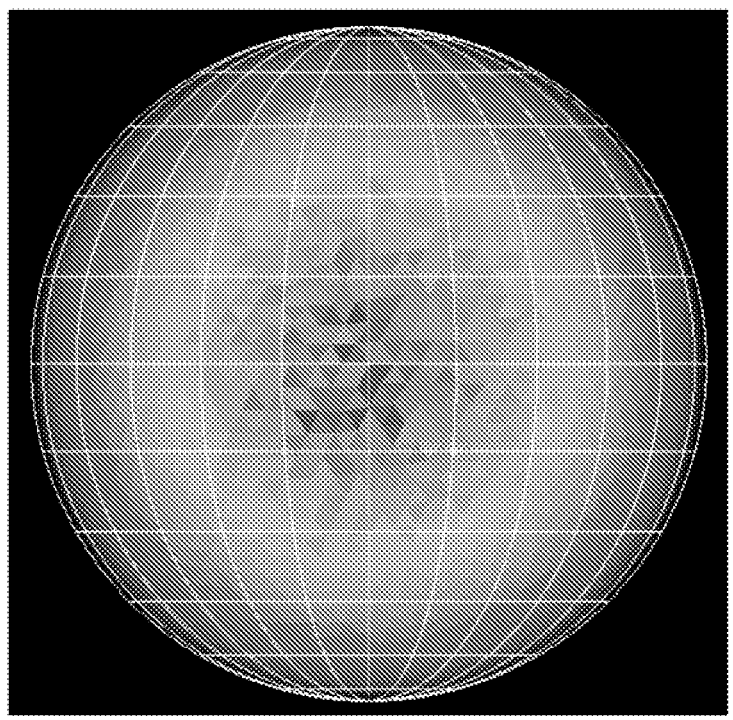
FIG. 9 is a schematic view illustrating an optical simulation of the fourth embodiment of the present invention.

Then, FIG. 9 shows the illumination distribution of the viewing angle simulated by the illumination structure of the fourth embodiment of the present invention with optical software. From FIG. 9, the light emitting surface diffused by the diffusion sheet (4) has a uniform illumination distribution.

Figure 10:
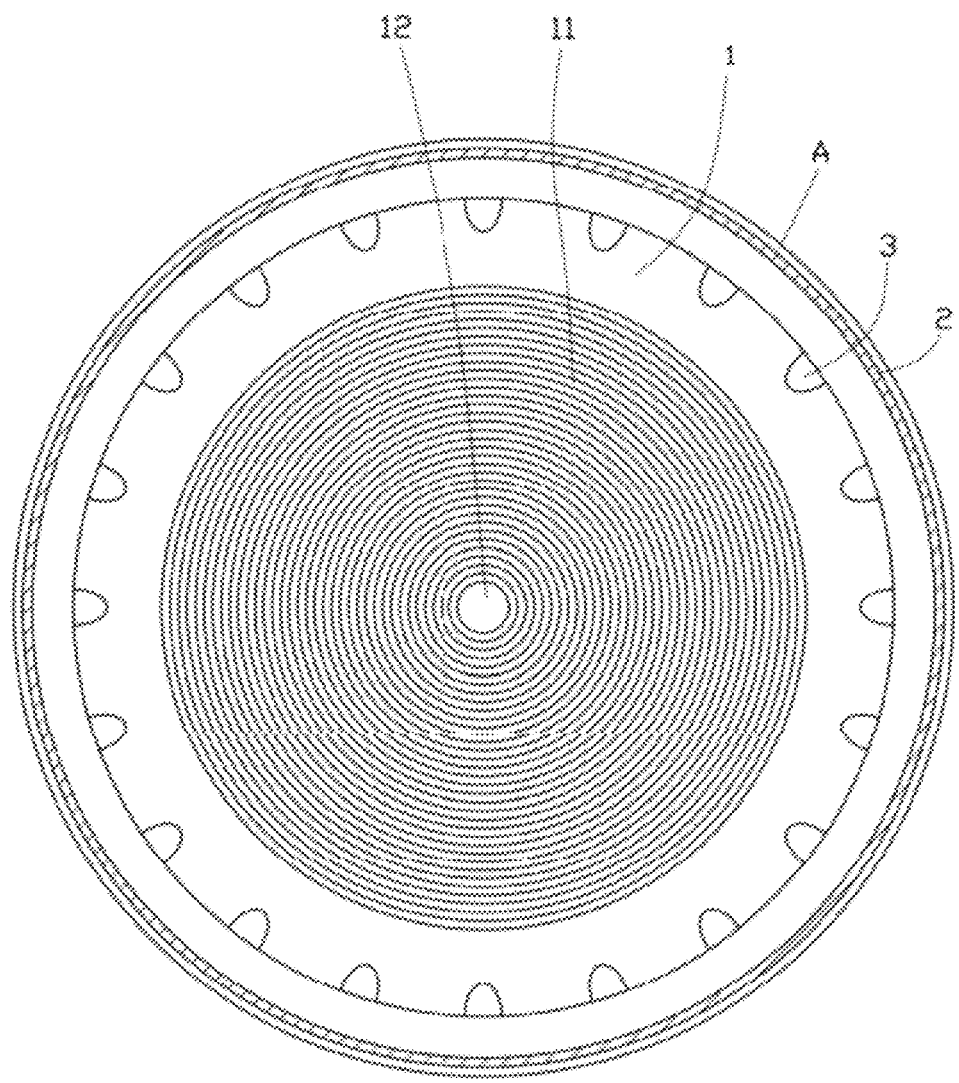
FIG. 10 is a schematic view illustrating a structure of a fifth embodiment of the present invention.

FIG. 10 shows a fifth embodiment of the present invention. In FIG. 10, in addition to the polygon, the optical bottom plate (1) may also be round, and the LED illumination components (3) are disposed on a periphery of the round optical bottom plate (1). In this manner, the diffusion sheet (4) may diffuse the uniform light emitting surface.

The illumination structure in any embodiment may generate the uniform light emitting surface, so the illumination structure may be used as the lighting equipment.

Figure 11:
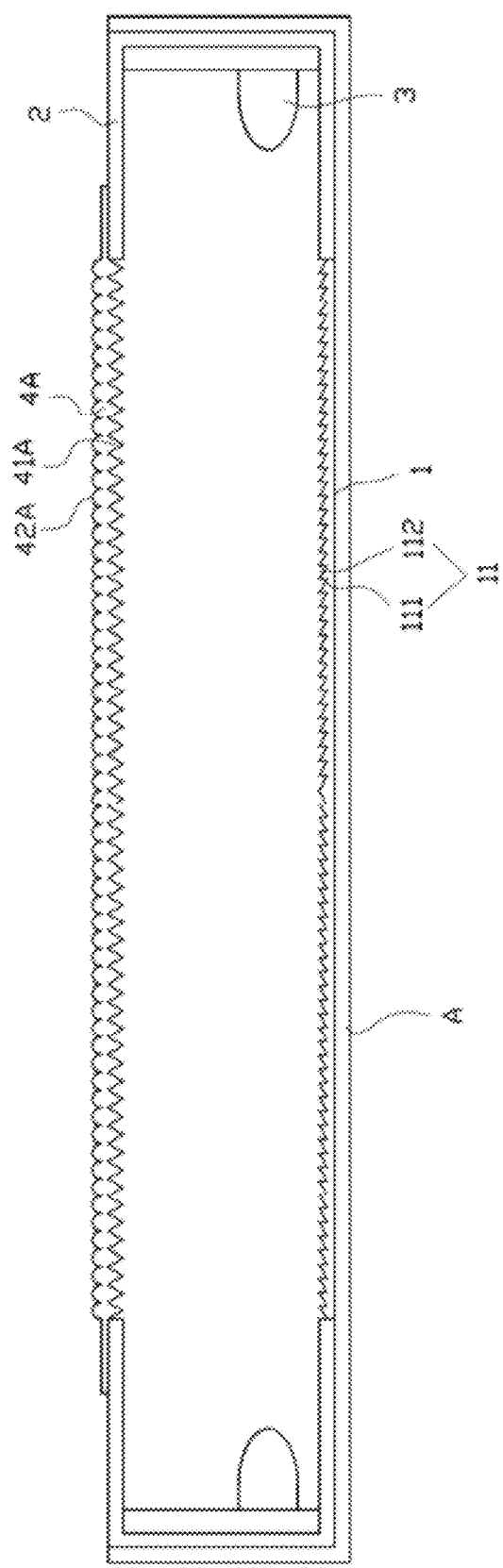
FIG. 11 is a schematic view illustrating a structure of a sixth embodiment of the present invention.

FIG. 11 shows a sixth embodiment of the present invention. Two opposite side edges of the rectangular optical bottom plate (1) are both connected with a reflection mask (2), and a plurality of LED illumination components (3) are arranged in the reflection masks (2) along the side edge of the optical bottom plate (1). A prism (4A) is arranged in the raising direction of the reflecting structures (11) of the optical bottom plate (1). A reverse prism structure (41A) with a zigzag cross-section is arranged on the side of the prism (4A) facing the optical bottom plate (1), and the prism (4A) has a plurality of arc embossment structures (42A) adjacent to one another corresponding to the reverse prism structure (41A).

Figure 12:
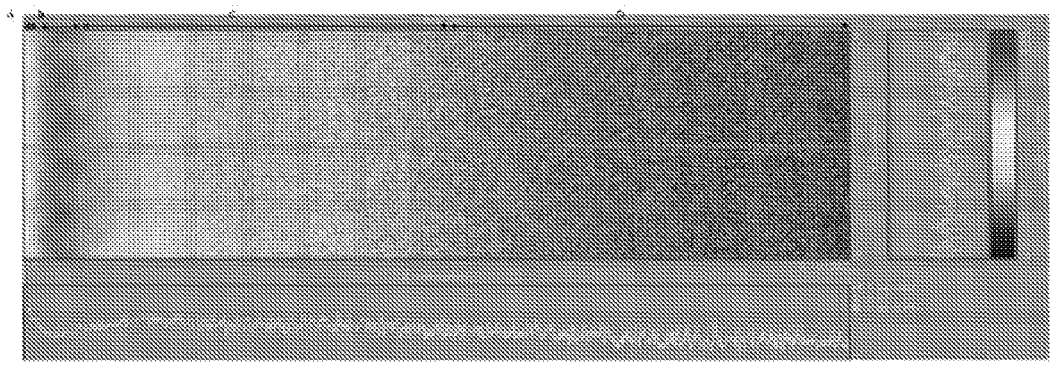
FIG. 12 shows illumination distribution simulation of the sixth embodiment of the present invention.

FIG. 12 shows the illumination distribution simulated by the illumination structure of the embodiment with the optical software. From FIG. 12, when the LED illumination components (3) on two side edges of the optical bottom plate (1) sequentially emits light, the illumination distribution is a symmetrical distribution, so the LED illumination components (3) are suitable to be the illumination structure for projecting the light source of the bare-eyed 3D image.

Figure 13:
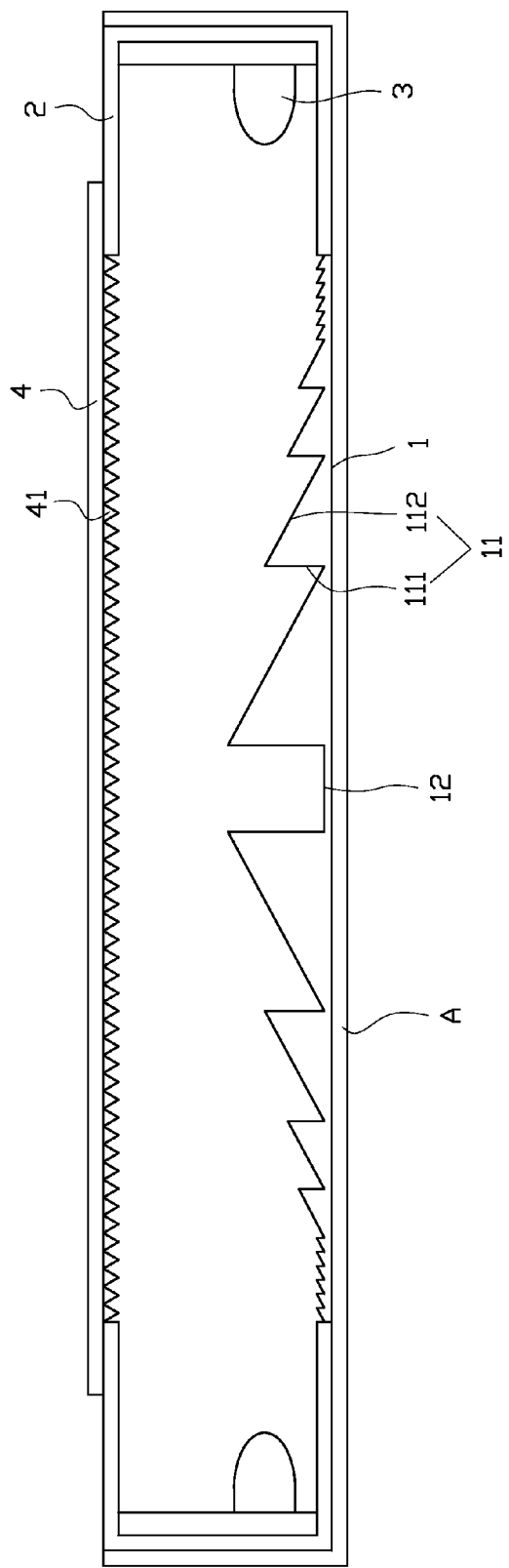
FIG. 13 is a schematic view illustrating a structure of a seventh embodiment of the present invention.

FIG. 13 shows a seventh embodiment of the present invention. The center of the optical bottom plate (1) forms a horizontal recess (12) adjacent to the reflecting structures (11). Wherein, the reflecting structures (11) are gradually raised towards the center of the optical bottom plate (1).

The operation, use and effects of the present invention are apparent from the illustration of the aforementioned embodiments. However, the aforementioned embodiments are merely exemplary embodiments of the present invention and shall not be considered as the limitations of the present invention. The equivalent variations and modifications made according to the description and claims of the present invention shall fall within the scope of the present invention.

What is claimed is:

1. An LED illumination structure without a light guide plate (LGP), comprising an optical bottom plate, a plurality of LED illumination components arranged at least along one side edge of the optical bottom plate and a plurality of reflecting structures parallel to the LED illumination components formed on the optical bottom plate from two opposite side edges of the optical bottom plate to a center of the optical bottom plate, wherein the reflecting structures are in a shape of a tapered embossment and each comprise a first side facing the center of the optical bottom plate and a second side facing the side edges of the optical bottom plate, and an optical film is arranged to oppose a raising direction of the reflecting structures of the optical bottom plate, wherein the center of the optical bottom plate forms a horizontal recess.

2. The LED illumination structure without the LGP of claim 1, wherein the first side of each reflecting structure is a vertical surface and the second side of the reflecting structure is a sloped surface.

3. The LED illumination structure without the LGP of claim 1, wherein the reflecting structures are gradually raised towards the center of the optical bottom plate.

4. The LED illumination structure without the LGP of claim 1, wherein an optical axis direction of the LED illumination components points to the second sides of the reflecting structures.

5. The LED illumination structure without the LGP of claim 1, wherein a half-power angle of radiation of the LED illumination components ranges from 5° to 15°.

6. The LED illumination structure without the LGP of claim 1, wherein the optical film is a diffusion sheet.

7. The LED illumination structure without the LGP of claim 6, wherein a reverse prism layer with a zigzag cross-section is arranged on a side of the diffusion sheet facing the optical bottom plate.

8. The LED illumination structure without the LGP of claim 1, wherein the optical bottom plate is in a shape of polygon and the LED illumination components are arranged on the two opposite side edges of the optical bottom plate.

9. The LED illumination structure without the LGP of claim 8, wherein the optical film is a prism, a reverse prism structure with a zigzag cross-section is arranged on the side of the prism facing the optical bottom plate, and the prism has a plurality of arc embossment structures adjacent to one another corresponding to the reverse prism structures.

10. The LED illumination structure without the LGP of claim 1, wherein the optical bottom plate is in a shape of polygon and the LED illumination components are disposed on a periphery of the optical bottom plate.

11. The LED illumination structure without the LGP of claim 1, wherein the optical bottom plate is a round shape and the LED illumination components are disposed on a periphery of the optical bottom plate.

12. The LED illumination structure without the LGP of claim 1, wherein the LED illumination components are arranged in a reflection mask.

\* \* \* \* \*